United States Patent [19]

Ohno et al.

[11] Patent Number: 5,609,525

[45] Date of Patent: Mar. 11, 1997

[54] VIDEO GAME DATA RECEPTION APPARATUS

[75] Inventors: Yugo Ohno; Shunichi Shoji, both of Yokohama; Atsushi Kitahara, Tokyo, all of Japan

[73] Assignees: NEC Mobile Communications, Ltd.; Comsys Corporation, both of Yokohama; Sega Enterprises, Ltd., Tokyo, all of Japan

[21] Appl. No.: 445,017

[22] Filed: May 22, 1995

[30] Foreign Application Priority Data

May 23, 1994 [JP] Japan ..................... 6-132521

[51] Int. Cl.$^6$ ..................................... A63F 9/22
[52] U.S. Cl. .................... 463/43; 463/1; 463/24
[58] Field of Search ..................... 463/1, 24, 29, 463/40, 43–44; 364/410, 141, 146; 348/78, 552; 340/323 R, 825.3, 825.31

[56] References Cited

U.S. PATENT DOCUMENTS

| | | | |
|---|---|---|---|
| 4,752,068 | 6/1988 | Endo | 463/24 |
| 4,782,468 | 11/1988 | Jones et al. | 463/24 |
| 4,858,930 | 8/1989 | Sato | 463/24 |
| 4,948,138 | 8/1990 | Pease et al. | 463/24 |
| 4,958,835 | 9/1990 | Tashiro et al. | 463/29 |
| 4,998,199 | 3/1991 | Tashiro et al. | 463/24 |
| 5,014,982 | 5/1991 | Okada et al. | 463/24 |
| 5,051,822 | 9/1991 | Rhoades | 463/29 |
| 5,238,250 | 8/1993 | Leung et al. | 463/24 |
| 5,251,909 | 10/1993 | Reed et al. | 463/29 |
| 5,396,225 | 3/1995 | Okada et al. | 463/40 |
| 5,489,103 | 2/1996 | Okamoto | 463/40 |

Primary Examiner—Jessica Harrison
Assistant Examiner—Mark Sager
Attorney, Agent, or Firm—Kanesaka & Takeuchi

[57] ABSTRACT

A television or video game data reception apparatus receives a data signal of television games transmitted from a base station in a wireless manner or through wire on a local station side so that the received data signal is used to play a game. The reception apparatus is provided, in addition to a game operation memory for storing a data signal of a predetermined game, a save memory for storing a predetermined state of a game, for example, at the time of termination of the game. The save memory is write protected when the save memory does not perform save operation so that for example when a game is terminated in the midway thereof, the data of the state at that termination can be saved in accordance with necessity.

4 Claims, 8 Drawing Sheets

VIDEO GAME DATA RECEPTION APPARATUS

BACKGROUND OF THE INVENTION

1. Field of the Invention

The present invention relates to a television or video game data reception apparatus and particularly relates to a television game data reception apparatus which is designed such that, for example, in each local station (in each home) or the like, a user can selectively use a desired one of television game softwares in the user's home in each local station (in each family) or the like.

2. Description of the Related Art

Computers mainly for home use, which are computers for playing television games (also called video games, computer games, and so on), have become popular. Generally, game data for such a television game is sold in a packaged state wherein the data has been written in a ROM (read only memory).

Accordingly, on one hand, there has been a troublesomeness for a user in that the user has to go to a game software shop every time the user wishes to get a software package desired. Particularly with respect to a popular game software, a line is formed in front of the shop and there is a case where a user cannot buy a game software when the user wishes to buy it.

On the other hand, in accordance with the content of a game, there is a case where a user loses interest in the game after playing the game only once or twice and is inconvenienced in disposing of the game software. In this regard, there is a software package in which, for example, a DRAM (dynamic random access memory) is used as a medium in which a game software is to be written and the content of the DRAM can be rewritten or renewed by a game software desired.

By use of such a software package, there is no waste of medium so that it can be said preferable in a viewpoint of saving in resource because a game data in one package can be rewritten or renewed by a different one. In this case, however, such a troublesomeness that a user must go to a game software shop every time the user desires such a renewal is not yet eliminated, because the rewriting operation cannot be carried out on the user's side.

The present applicants proposed a television game data transmission/reception system in Japanese Patent Application No. 125285/1993 (Japanese Patent Unexamined Publication No. 319874/1994). This system comprises a base station and a plurality of local stations connected to the base station in a wireless manner or through wire so that a television game data signal is transmitted from the base station to the local stations. Each of the local stations is provided with an adapter connected to a game machine body for receiving the television game data signal, and the adapter is provided with a memory for storing the data signal so that the television game data signal can be desiredly and selectively written into the memory.

According to this system, therefore, a user can obtain a desired television game data easily in the user's home and can enjoy the game repeatedly by reading out the game from the memory.

For example in the case of a game where some stages are provided in accordance with the degree of advancement, however, there is an inconvenience that a user must start the game from the first stage when the user wishes to play the same game again after the user stops the game in the midway of the game.

SUMMARY OF THE INVENTION

The present invention has been attained by eliminating such a disadvantage in the conventional case and it is an object of the present invention to provide a television game data reception apparatus which can receive television game data transmitted from a base station (data distributing origin) to enable a user to play the television gage, and, if necessary, can save for example the state of the way of the game.

In order to achieve the above object, according to an aspect of the present invention, the television game data reception apparatus for use in the case where a data signal of television games transmitted from a base station in a wireless manner or through wire is received on a local station side so that the received data signal is used to play a game, comprises a game operation memory for storing a data signal of a predetermined game and a save memory for storing a predetermined game state at the time of termination of a game, the save memory being given write protection when the save memory does not perform save operation.

In the television game data reception apparatus, preferably, the save memory is given write protection in the case where the game stored in the game operation memory does not use a memory area allotted to the save memory.

In the television game data reception apparatus, preferably, two memories are provided as the save memory and designed so that when the predetermined game state is stored in one of the two memories at the time of termination of the game, the other one of the two memories is given write protection.

Preferably, the television game data reception apparatus further comprises, in addition to the save memory, a directory memory for storing at least a title of a game to be stored in the save memory, whereby when the predetermined game state is stored in the save memory at the time of termination of a game, the directory memory is referred to so that if the same game is already stored in the save memory, the data in the save memory is renewed by a current game state.

According to the above configuration, data of a game which is freely and selectively designated by a user from television games transmitted from the base station is taken into the game operation memory so that the user can enjoy the game. In the case where the user terminates the game in the midway thereof, for example, the user can store the state of the game into the save memory at the time of termination of the game if necessary.

In the case where the user wishes to play the same game again by newly selecting and taking the data of the same game into the game operation memory in another time, it is possible that the user can start the game from the scene where the game was terminated at the preceding time if the user reads out the data of the game from the save memory.

In that case, since the save memory has given write protection when the memory does not perform the save operation, the data stored in the save memory cannot be broken even if, for example, a game software having different program specification is intended to be taken into the save memory.

The advantages according to the present invention will be understood more when the following description about embodiments of the present invention is read in conjunction with accompanying drawings as follows.

DESCRIPTION OF THE PREFERRED EMBODIMENTS

Figure 1:
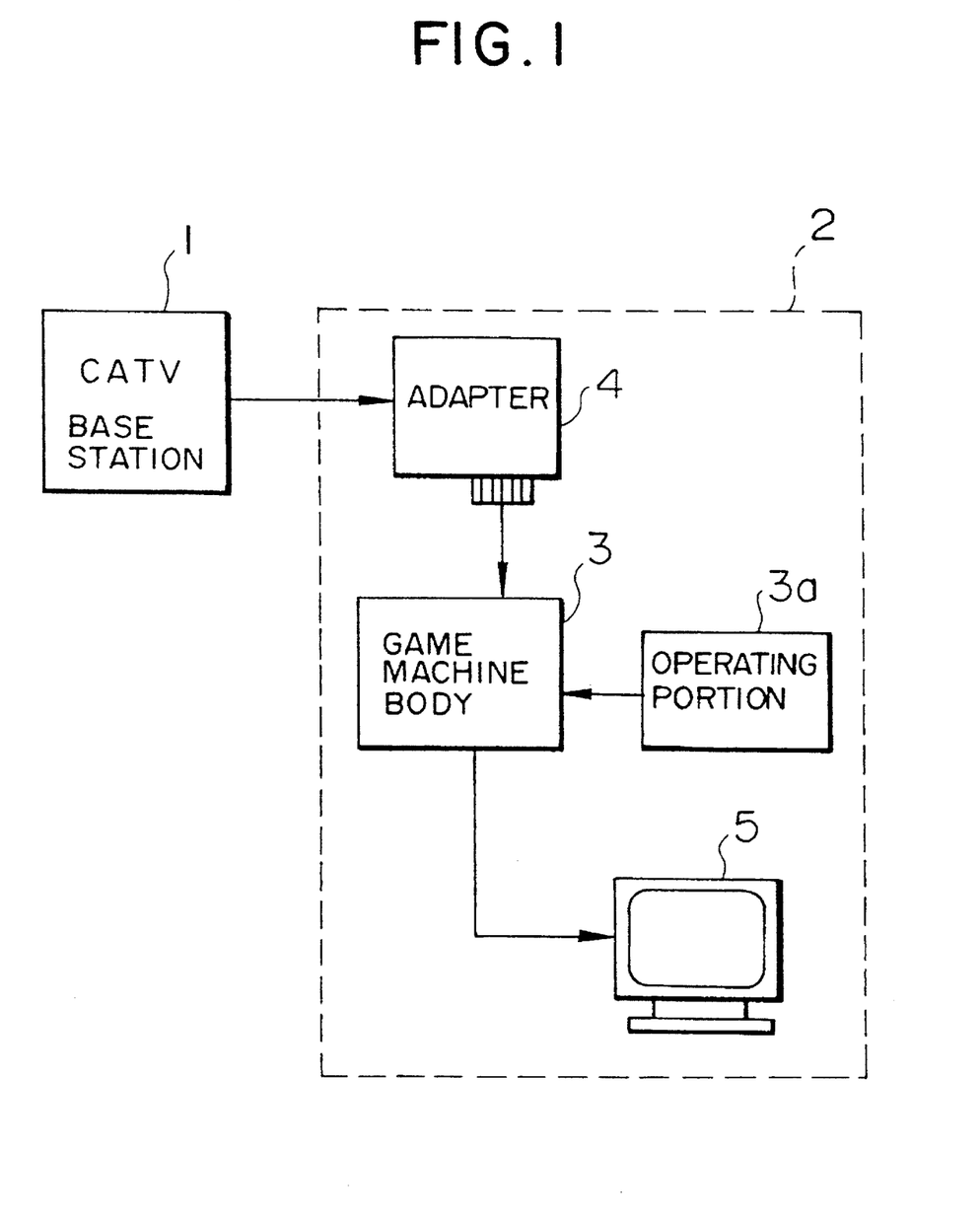
FIG. 1 is a block diagram briefly showing the configuration of a transmission/reception system to which the reception apparatus according to the present invention is applied.

Referring to FIG. 1, first, the outline of the television game data transmission/reception system will be described. In this embodiment, the base station 1 as a data distributing origin is illustrated as a CATV station of a cable television network and each home connected to the base station 1 through a coaxial cable is assumed as a local station 2.

In this transmission/reception system, a data signal of television game software is transmitted with a predetermined frequency from the base station 1 to the respective local stations 2. In this regard, an reception adapter 4 to be connected to a game machine body 3 is prepared on the local station 2 side. This adapter 4 corresponds to the reception apparatus according to the present invention.

Figure 3:
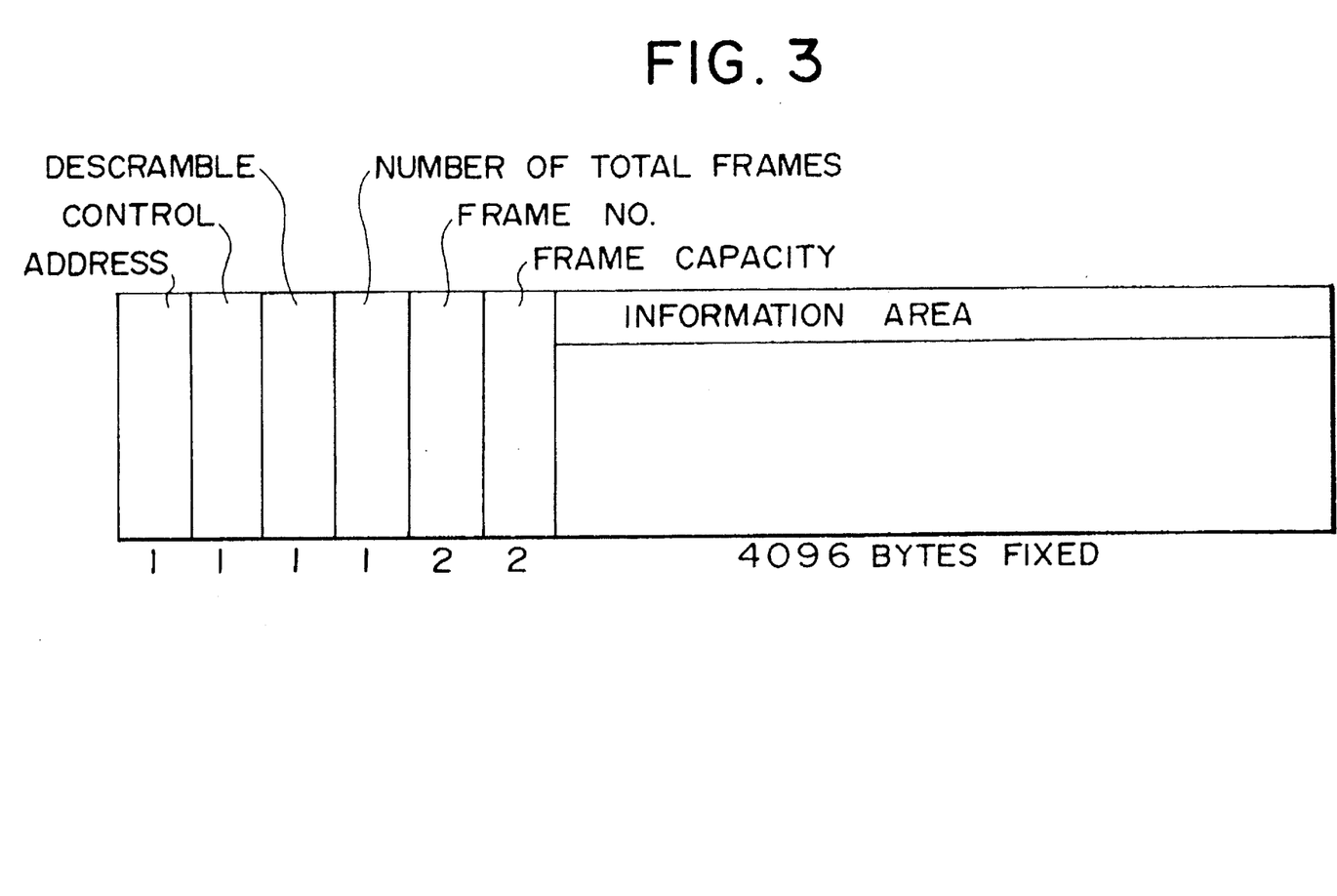
FIG. 3 is an explanatory view showing the transmission format of a game data signal.

Here, a transmission format of the data signal of the television game transmitted from the base station 1 will be described below. FIG. 3 shows the whole of the transmission format, and frames to be sent out include an ID (identification) frame, a control frame, an information frame, and a game data frame.

As shown in FIG. 3, the transmission format for transmitting each of an ID frame, a control frame, a game data frame, and an information frame consists of "address portion", "control portion", "descramble portion", "number of total frames", "frame No.", "frame capacity" and "information area". The address of the associated frame is set in the "address portion" disposed in the head place, and data for controlling the information in the associated frame are stored in the "control portion". A descramble code for making sure of privacy is set in the "descramble portion". The number of total frames to be transmitted is set in the "number of total frames", and a serial number of the associated frame is set in the "frame No." The number of effective bytes of the "information area" for each frame is set in the "frame capacity", and, in this example, it is fixed to 4096 bytes in which various kinds of information of the associated frame is written.

Figure 4:
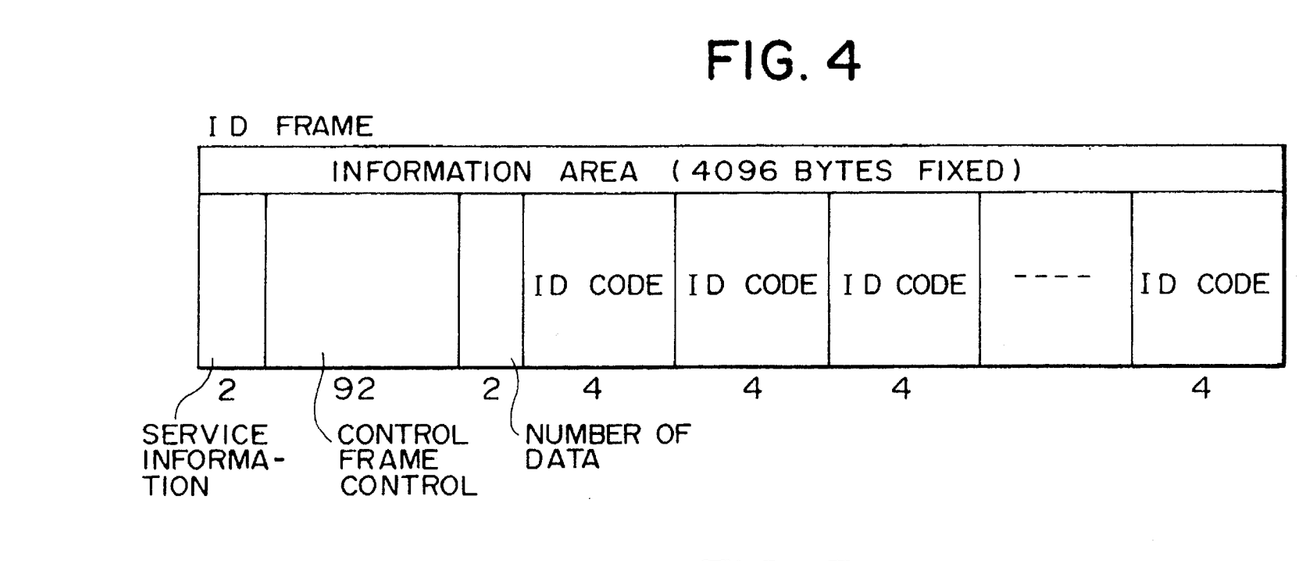
FIG. 4 is an explanatory view showing the format of the ID frame.

As shown in FIG. 4, the ID frame which is to be written in the information area of the transmission format of FIG. 3 contains: service information including an ID management service information identification value; a control frame control portion for controlling a control frame setting value; the number of data as the number of effective ID codes in one frame; and ID codes of the adapter 4 effective to the service information. In this case, the ID codes are arranged so as to be sorted in the order of ascending.

Figure 5:
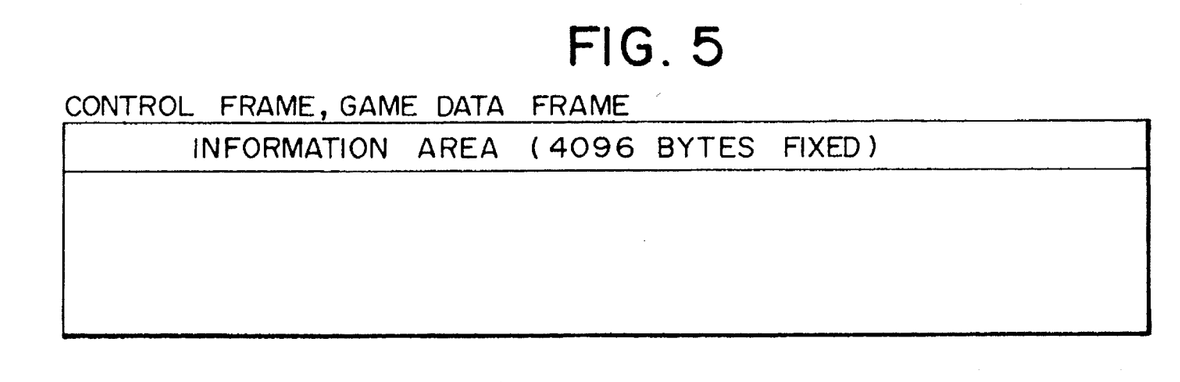
FIG. 5 is an explanatory view showing the format for each of the control frame and the game data frame.

In this embodiment, as shown in FIG. 5, each of the control frame and the game data frame is written individually in the information area of the format of FIG. 3, so that the control frame and the game data frame which are written individually in the separate formats of FIG. 3 are transmitted successively. That is, the information area of the control frame is fixed to 4096 bytes and the game data frame is also fixed to 4096 bytes.

Figure 6:
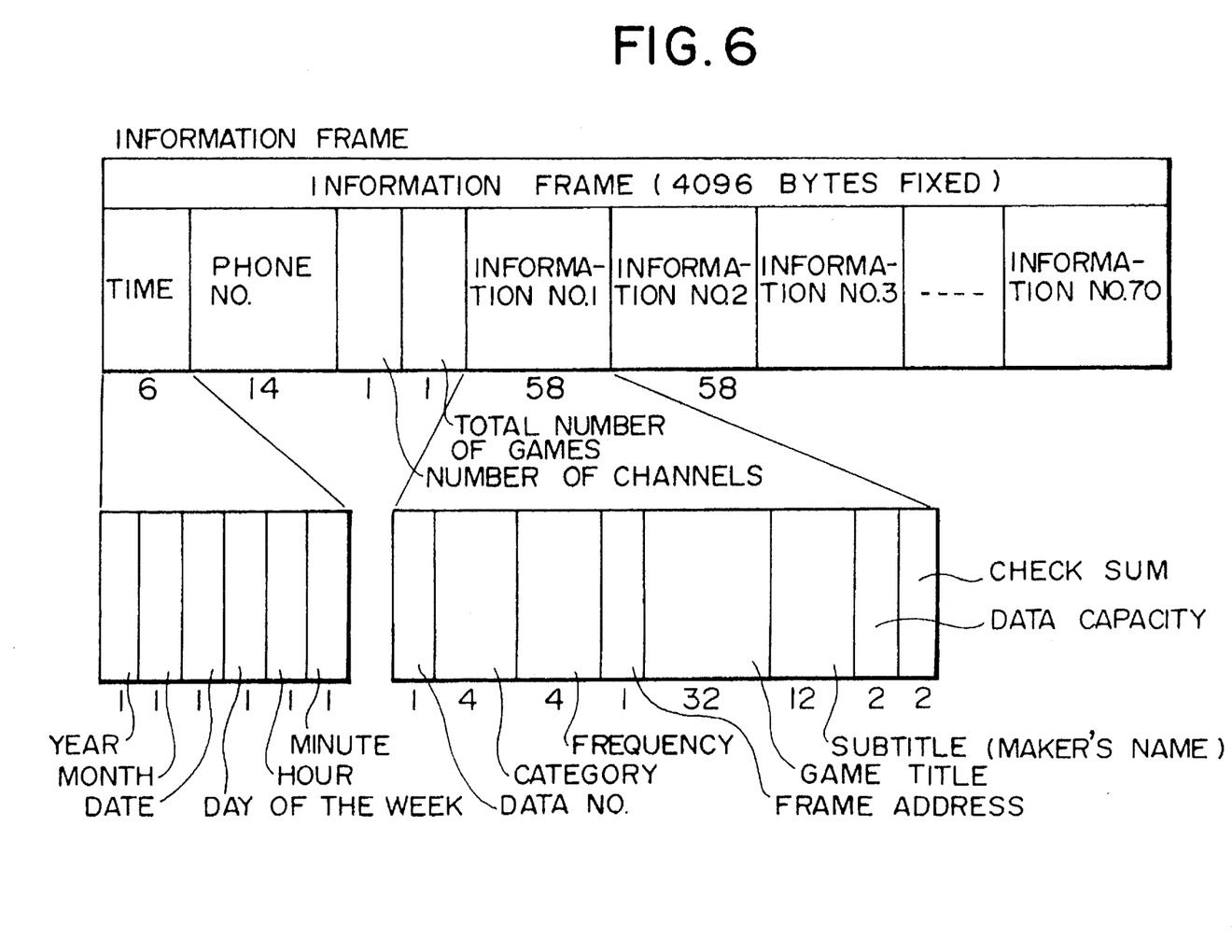
FIG. 6 is an explanatory view showing the format of the information frame.

As shown in FIG. 6, the information frame which is written in the information area of the format of FIG. 3 contains: the time data; the telephone number for communication, the number of channels (the number of transmitters on the base station 1 side); the total number of games transmitted from the base station 1; the information data; and so on. In this case, the information data contains the category, title, and sub-title (for example, maker's name) of the game.

Figure 7:
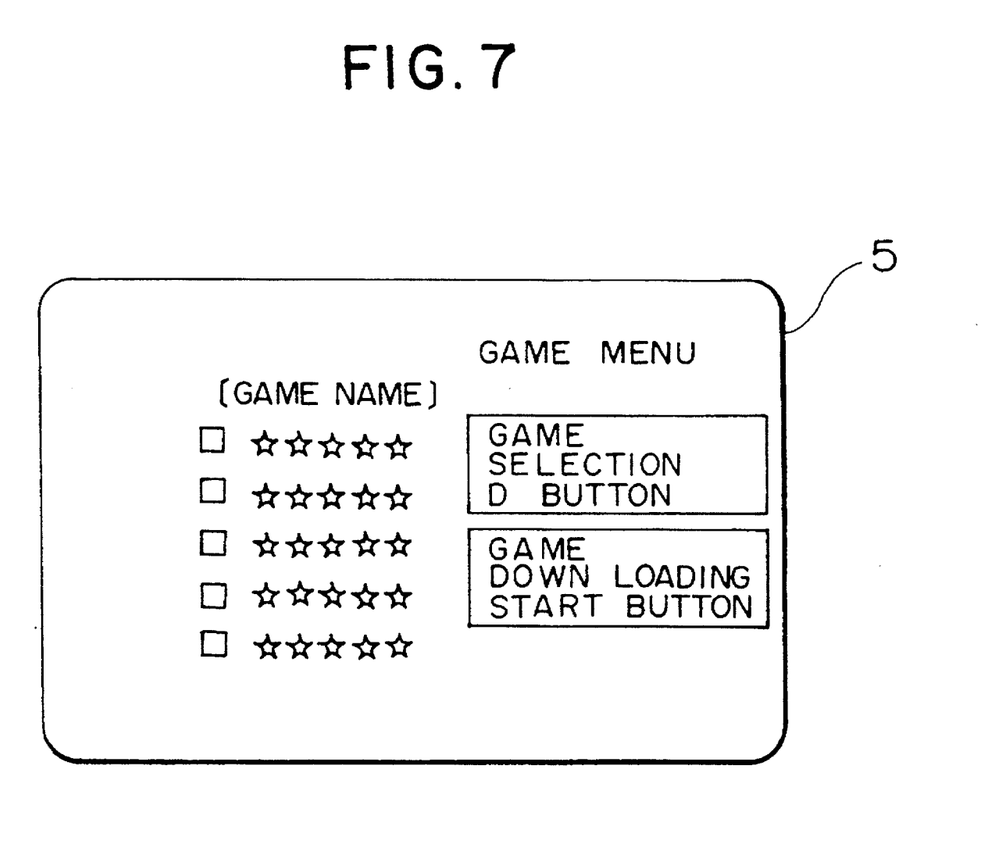
FIG. 7 is a model view showing an example of display of a game menu picture scene.

On the basis of those data mentioned above, a game menu picture scene is displayed on a display 5 on the user side as shown in FIG. 7. As the modulation system in this case, an FSK (frequency shift keying) system is employed, and the frequency band is divided by 3 MHz into sub-bands so that channels are allotted to these sub-bands respectively.

As the modulation system, alternatively, an ASK (amplitude shift keying) system, a PSK (pulse shift keying) system, or the like, may be employed. In this embodiment, the data signal is transmitted by means of an HDLC (high level data link control) procedure.

Figure 2:
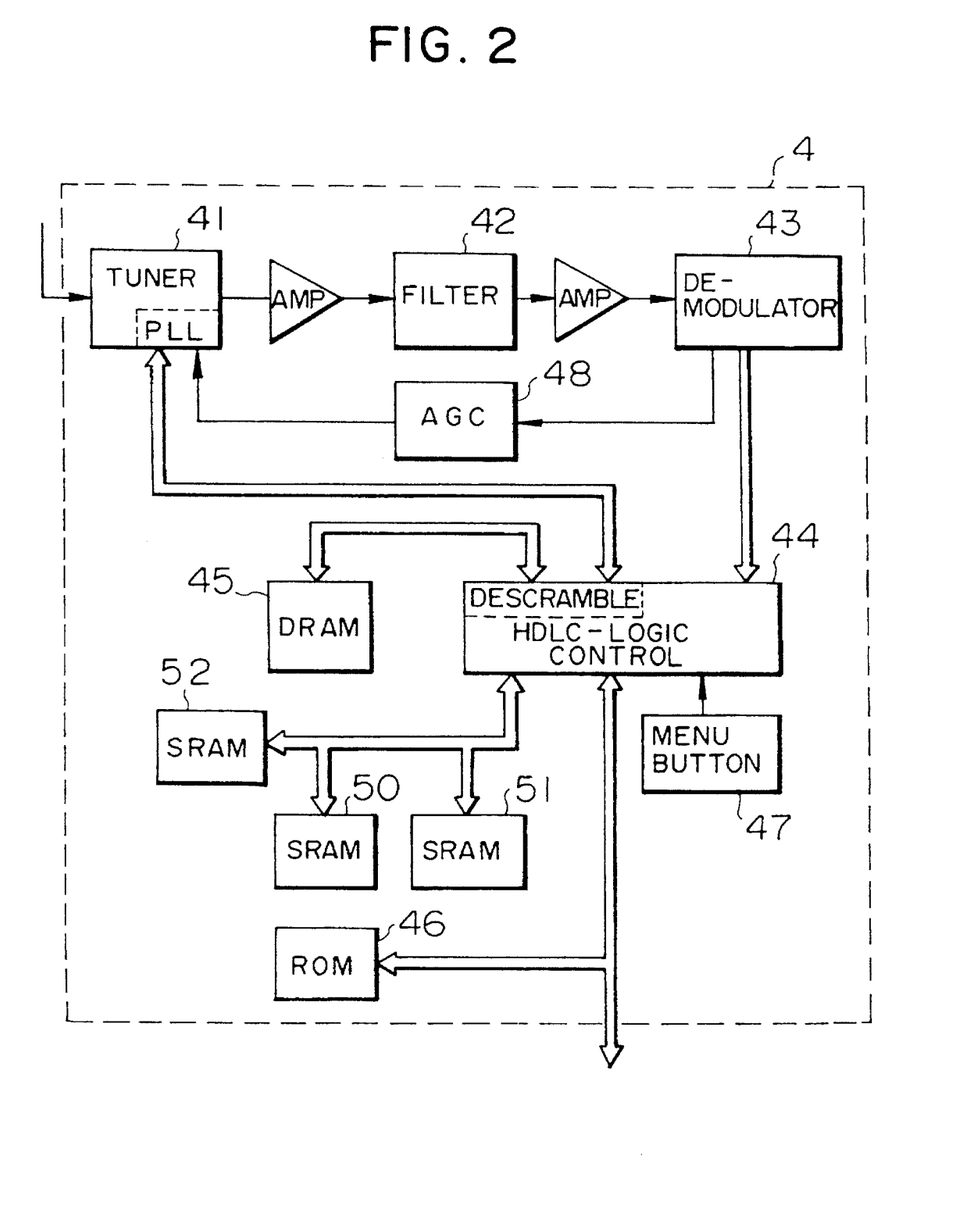
FIG. 2 is a block diagram of the adapter (reception apparatus) shown in FIG. 1.

Next, referring to FIG. 2, the adapter 4 which is the reception apparatus according to the present invention will be described. In this embodiment, a reception portion of the adapter 4 is constituted by a TV tuner 41 which tunes out any frequency by a step of 62.5 KHz in every sub-band of 3 MHz, that is, in every channel within the frequency band of 50~550 MHz. The tuned signal is outputted after it is converted into an IF signal of 45 MHz. A PLL (phase-locked loop) circuit is included in the tuner 41.

A filter circuit 42 is connected to the tuner 41 at the following stage thereof. The filter circuit 42 operates to extract a band width of about 3 MHz (peak-to-peak value) around the IF frequency of 45 MHz to thereby eliminate disturbance from adjacent channels.

The FSK modulated wave extracted through the filter circuit 42 is FM-demodulated in a demodulation circuit 43 and then inputted as serial data to a control circuit 44. Feedback is made from the demodulation circuit 43 to the PLL circuit of the tuner 41 through an automatic gain control (AGC) circuit 48.

In the control circuit 44, the serial data from the demodulation circuit 43 is deformatted by the HDLC processing. By this processing, flags added in the HDLC processing and FCS data are eliminated so that only the data required are extracted, and the extracted data is converted into parallel data.

In the game menu picture scene shown by way of example in FIG. 7, if a user selects a game by means of a menu button 47 of an operation portion 3a, the control circuit 44 writes the data of the game into a DRAM (dynamic random access memory) 45. Thus, the user may enjoy the game by reading the game data into a game machine body 3.

The DRAM 45 is a memory for game operation, and the number of games which can be written into the memory depends on the memory capacity (24 Mbits in this example). In other words, the memory capacity of the DRAM 45 may be selected in accordance with the number of games to be written into the memory. Although the data in the DRAM 45 may be erased freely through the control circuit 44, the DRAM 45 is programmed so that the data in the DRAM 45 is erased when the communication with the base station 1 is made off (specifically, when the power supply to the adapter is turned off, and, in the actual case, when the power supply to the game machine is tuned off because the adapter is supplied with power by the game machine per se). In addition, the adapter 4 is provided with an ROM (read only memory) 46 having a starting program which has been written in advance so as to operate when the adapter 4 is turned on, so that the adapter 4 operates in accordance with this starting program until completion of reception of a game.

When the user wished to change selection to obtain another game after start of one game, the user selects "reset" of menu buttons 47 so as to make the picture scene return to the game menu picture scene of FIG. 7.

Figure 8:
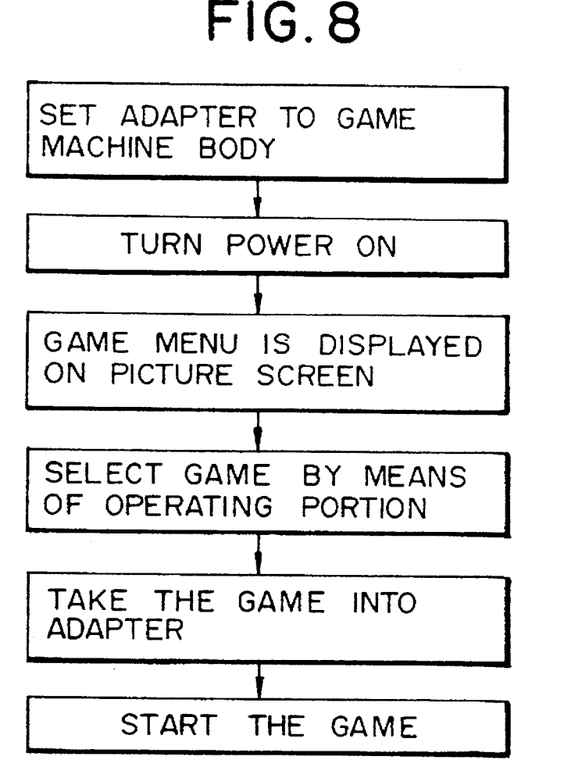
FIG. 8 is a flow chart showing the procedure of operation start.

Merely by way of example, a flow chart of starting procedure is shown in FIG. 8. First, the user sets the adapter 4 to the game machine body 3 and then turns the power supply on, so that the game menu is displayed on the display 5 (see FIG. 7). Then, the user select a game by means of the menu buttons 47 so that the game is taken into the DRAM 45 which acts as a game operation memory of the adapter 4. Thus, the game is started.

The adapter 4 is provided, in addition to the DRAM 45 acting as a game operation memory, with a save memory for saving (backing up( a picture scene at a termination when, for example, the user terminates the game in a midway thereof, and a directory memory for storing the title of the game to be saved, the data at that time, and so on.

In this embodiment, two SRAM (static RAM) 50 and 51 each of which has a storage capacity of 256 Kbits are used as the save memory, and an SRAM 52 having a storage capacity of 64 Kbits is used as the directory memory.

Alternatively, a DRAM, an EPROM (electrically programmable ROM in which the data thereof can be erased and new data can be rewritten thereto), or the like may be used in place of the SRAM.

Figure 10:
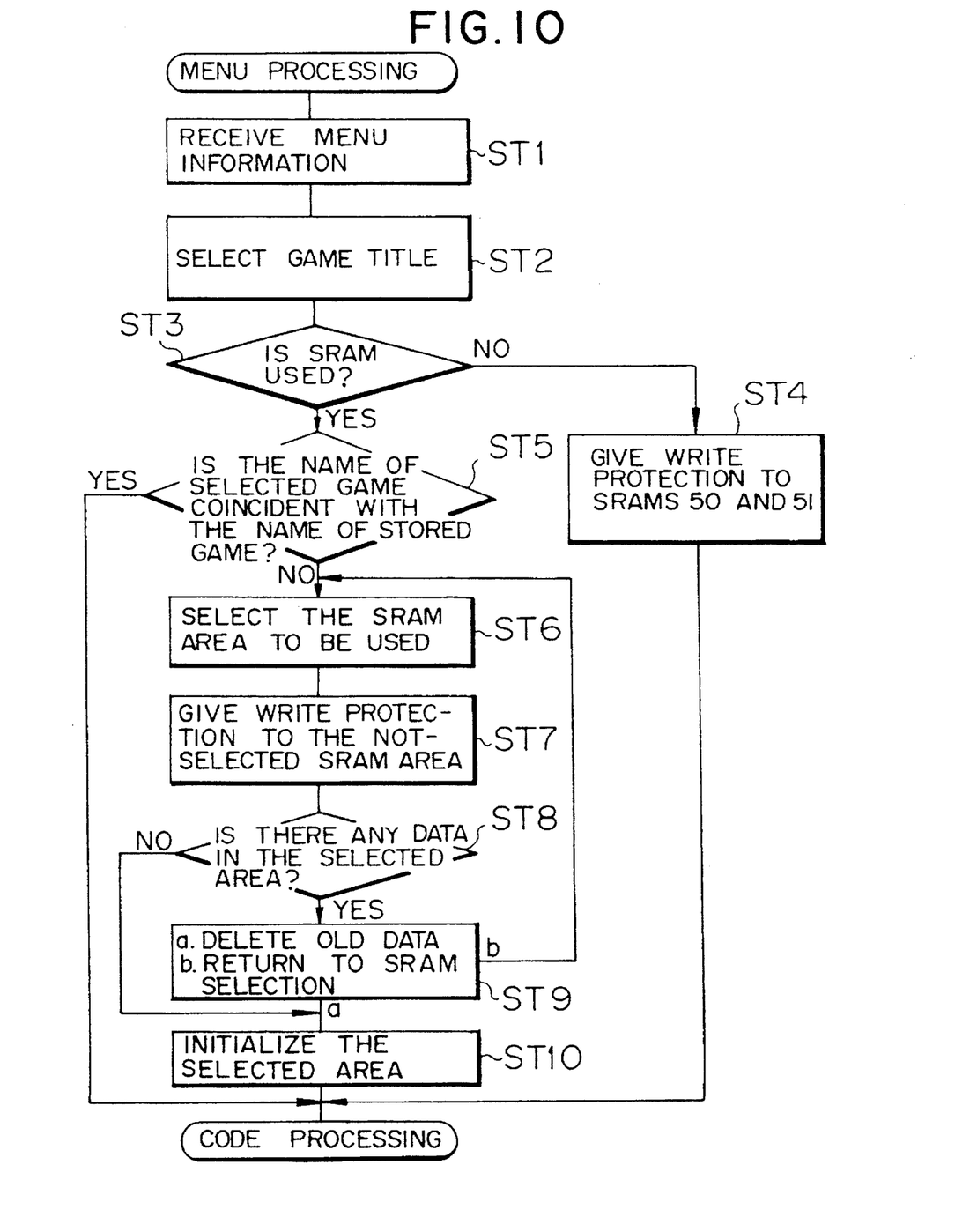
FIG. 10 is a flow chart for explaining the operation at the time of saving data.

The operation at the time of data saving will be described with reference to a flow chart of FIG. 10. Assume that a game is terminated in the midway thereof. Then, a menu processing routine is carried out and menu information is received (step ST1), so that the user selects the title of the game to be saved on the picture scene of the menu (step ST2).

By this, for example in a micro-controller portion of the control circuit 44, a judgment is made as to whether the selected game uses, in accordance with the program thereof, memory areas allotted to the SRAMs 50 and 51 or not (step ST3). If those memory areas are not used, both the SRAMs 50 and 51 are given write protection (step ST4) so that no data can be saved in the SRAM 50 and 51.

If it is concluded in the step ST3 that the SRAMs 50 and 51 are used, the content of the directory SRAM 52 is referred to thereby judge in the next step ST5 whether the game selected has been stored in either one of the SRAMs 50 and 51 on the basis of the title of the selected game or not.

If the step ST5 indicates "yes" or proves that the game selected has been stored in either one of the SRAMs 50 and 51, the content of the SRAM 50 or 51 in which the game selected has been stored is rewritten or replaced by the data showing the state at the time of termination of the game.

Figure 9:
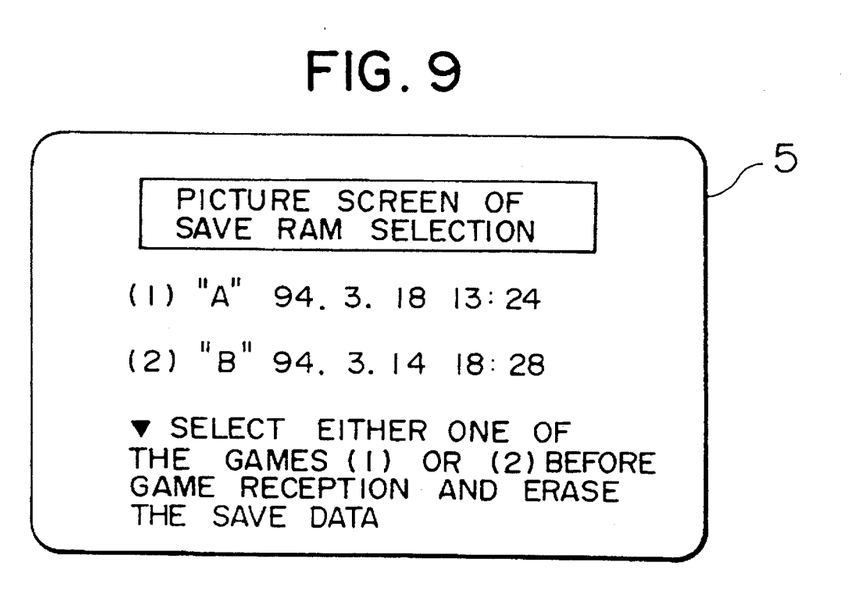
FIG. 9 is a model view showing an example of selection picture scene of the save RAM.

In the case where the step ST5 indicates "NO" or proves that the game selected has not been stored yet, a picture scene for save RAM selection is displayed on the display 5 as shown in FIG. 9 so that the user can select the area of either one of the SRAM 50 (item 1) and the SRAM 51 (item 2) by looking at the picture scene (step ST6). In this selection picture scene, for example, the title of the game which has been saved, and the data when the game has been saved are further displayed.

Here, assume that the area on the SRAM 50 side in the item (1) is selected. Then, the other SRAM 51 is given write protection in step ST7, and a judgment is made as to whether the SRAM 50 selected has data therein or not in the next step ST8. If the SRAM 50 has no data, the SRAM 50 is initialized in step ST10 and then data in a state where the game is terminated in a midway thereof are written into the SRAM 50 in accordance with code processing.

If it is proved in the step ST8 that data exist in the SRAM 50, the user is requested in the step ST9 to select either one of the item (a) erasing the old data and the item (b) returning to the selection of the other SRAM. If the (a) is selected, the SRAM 50 is initialized in the step ST10 and then the data in the state where the game is terminated in the midway thereof are written into the SRAM 50. If the item (b) is selected, on the contrary, the routine returns to the step ST6 in which the user is requested to select again the SRAM to which the data are to be stored.

Although two SRAMs are used as the save memory in this embodiments, the same memory may be constituted by one SRAM or three or more SRAMs. In any case, data of a game in the state where the game is terminated in the midway thereof or in the state at a predetermined scene of the game are saved in such a manner as described above, so that it is made possible to continue the same game from the state where the game was terminated at the preceding time if the user reads out the saved data in the case where the user wishes to play the same game again by receiving the data of the same game in another time. Although description has been made as to the case where the base station 1 is connected to each of the local station 2 through a coaxial cable of the CATV in the above embodiment, signals may be transmitted, for example, through a satellite, such as a BS (broadcasting satellite), a CS (communication satellite), or the like. In that case, the above-mentioned adapter 4 may be integrally provided in each reception terminal device.

As the game machine, other than a game machine used in every home or family, each of game machines provided in a game center (a play center where game machines are arranged side by side) may be used. In this case, television games may be selected by each game machine so that the efficiency of use of each game machine may be improved by the provision of the adapter (this means that in each game machine in a game center, generally, only one game may be played fixedly).

As apparent from the above description, according to the present invention, an adapter acting as a reception apparatus is connected to a game machine body so that not only a user can selectively enjoy, for example, in the user's home, television game software transmitted from a base station, but also the user can save, for example, when the user wishes to terminate a game in the midway thereof, the state of the picture scene of the game at the time of termination into a save memory on demands. When the user wishes, at a different time, to newly select and take the game software which is the same as that in the preceding case into a game operation memory, the user can read the data at the termination of the game in the preceding case from the save memory to thereby start the same game from the picture scene at the time of the preceding termination.

In that case, there is such an effect that, since the save memory has been given write protection when the save memory does not perform save operation, the data stored in the save memory cannot be broken even if, for example, a game software having different program specification is intended to be taken into the save memory.

What is claimed is:

1. A video game data reception apparatus which receives a data signal of video games transmitted from a base station in a wireless manner or through wire on a local station side to play a game, said reception apparatus comprising a game operation memory for storing a data signal of a predetermined game and a save memory for storing a predetermined game state on termination of a game, said save memory being write protected when said save memory should not perform save operation.

2. A video game data reception apparatus according to claim 1, wherein said save memory is write protected where the game stored in said game operation memory does not use a memory area allotted to said save memory.

3. A video game data reception apparatus according to claim 1, wherein said save memory has two memories so that when the predetermined game state is stored in one of said two memories on termination of the game, the other of said two memories is write protected.

4. A video game data reception apparatus according to claim 3, wherein said reception apparatus further comprises a directory memory for storing at least a title of a game stored in said save memory so that when the predetermined game state is stored in said save memory on termination of a game, said directory memory is checked to determine whether the titles of the game stored in said save memory and the game played match, and if the titles match, the data in said save memory is renewed by a current game state.

* * * * *